United States Patent
Kim et al.

(10) Patent No.: US 9,253,267 B2
(45) Date of Patent: Feb. 2, 2016

(54) PORTABLE ELECTRONIC APPARATUS FUNCTIONING AS PEN-TABLE AND COMPUTER SYSTEM USING THE SAME

(71) Applicant: Samsung Electronics Co., Ltd., Gyeonggi-do (KR)

(72) Inventors: Young-Suk Kim, Gyeonggi-do (KR); Hyon-Myong Song, Daegu (KR); Jong-Woo Kim, Gyeonggi-do (KR); Young-Jin Yi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/141,763

(22) Filed: Dec. 27, 2013

(65) Prior Publication Data

US 2014/0108612 A1    Apr. 17, 2014

Related U.S. Application Data

(63) Continuation of application No. 12/551,653, filed on Sep. 1, 2009, now Pat. No. 8,644,882.

(30) Foreign Application Priority Data

Sep. 9, 2008    (KR) .................. 10-2008-0088847

(51) Int. Cl.
*H04B 7/00* (2006.01)
*H04L 29/08* (2006.01)
*G06F 1/16* (2006.01)
(Continued)

(52) U.S. Cl.
CPC .............. *H04L 67/18* (2013.01); *G06F 1/1626* (2013.01); *G06F 3/03545* (2013.01); *G06F 3/0416* (2013.01); *H04M 1/7253* (2013.01); *H04W 84/12* (2013.01); *H04W 88/02* (2013.01)

(58) Field of Classification Search
CPC ............ H04W 88/02; H04M 1/72519; H04M 1/72583
USPC ................................................... 455/557, 566
See application file for complete search history.

(56) References Cited

U.S. PATENT DOCUMENTS 6,633,759 B1 * 10/2003 Kobayashi ............ H04W 88/06
                                                              455/418
6,784,855 B2 *  8/2004 Matthews ............. G06F 1/1601
                                                              345/1.1

(Continued)

FOREIGN PATENT DOCUMENTS

KR    2001-0091261 A    10/2001

*Primary Examiner* — April G. Gonzales
(74) *Attorney, Agent, or Firm* — Cha & Reiter, LLC.

(57) ABSTRACT

A portable electronic apparatus functioning as a pen-table, includes a touch-screen module for detecting contact with an external object and creating position data of a detected region. The portable electronic apparatus, by functioning as a pen-table, eliminates the need to install or carry a mouse, a pen-table, etc. for controlling a personal computer, a laptop computer or the like. A local area communication module transmits and receives data based on a local area communication protocol, and a display module displays the detected region and information on a user interface (UI) and functions of the apparatus. A controller controls the operations of the modules in response to the user's input so as to transmit position data created by the touch-screen module to an electronic device that includes the functions of a pen-table and local area communication.

20 Claims, 3 Drawing Sheets

(51) Int. Cl.
  *G06F 3/0354* (2013.01)
  *G06F 3/041* (2006.01)
  *H04M 1/725* (2006.01)
  *H04W 84/12* (2009.01)
  *H04W 88/02* (2009.01)

(56) References Cited

U.S. PATENT DOCUMENTS

| | | | | |
|---|---|---|---|---|
| 7,176,896 B1* | 2/2007 | Fahraeus | ............... | G06K 9/22 345/173 |
| 7,183,999 B2* | 2/2007 | Matthews | ............ | G06F 1/1601 345/1.1 |
| 7,206,559 B2* | 4/2007 | Meade, II | ............. | G08C 17/02 455/151.1 |
| 7,696,953 B2* | 4/2010 | Matthews | ............ | G06F 1/1601 345/1.1 |
| 8,005,470 B2* | 8/2011 | Barkley | ............... | H04W 92/18 345/531 |
| 2002/0109665 A1* | 8/2002 | Matthews | ............ | G06F 1/1601 345/156 |
| 2004/0235532 A1* | 11/2004 | Matthews | ............ | G06F 1/1601 455/566 |
| 2006/0194539 A1* | 8/2006 | Barkley | ............... | H04W 92/18 455/41.2 |
| 2007/0010195 A1* | 1/2007 | Brown | .................. | H04H 60/73 455/3.06 |
| 2007/0143517 A1* | 6/2007 | Matthews | ............ | G06F 1/1601 710/303 |
| 2008/0102755 A1* | 5/2008 | Barkley | ............... | H04W 92/18 455/41.2 |
| 2009/0203403 A1* | 8/2009 | Gidron | ............... | H04L 12/5895 455/557 |
| 2010/0082868 A9* | 4/2010 | Matthews | ............ | G06F 1/1601 710/303 |
| 2010/0302141 A1* | 12/2010 | Shankar | ............... | G06F 3/1454 345/156 |

* cited by examiner

PORTABLE ELECTRONIC APPARATUS FUNCTIONING AS PEN-TABLE AND COMPUTER SYSTEM USING THE SAME

CLAIM OF PRIORITY

The present application is a Continuation of U.S. patent application Ser. No. 12/551,653 filed on Sep. 1, 2009 which claims the benefit under 35 U.S.C. §119(a) from an application entitled "Portable Electronic Apparatus Functioning as Pen-Table and Computer System Using the Same" filed in the Korean Intellectual Property Office on Sep. 9, 2008 and assigned Serial No. 10-2008-0088847, the contents of which are hereby incorporated by reference in its entirety.

BACKGROUND

1. Technical Field

The present disclosure relates to a portable communication terminal. More particularly, the present invention relates to a portable communication terminal which can function as a pen-table of a computer using external input devices.

2. Description of the Related Art

One of the current trends in the computer industry is to optimize the ability to interface between a computer and a user. Diverse kinds of human engineering and efficient products have allowed users to disengage from a familiar wired environment to other environments that are often more convenient than the wired environment. In particular, the adaptation of local area communications to an input device of a computer makes it possible to use wireless mouse, wireless head-sets, wireless keyboards, wireless pen-mouse, pen-tables and the like, just to name a few possibilities.

Due to the advantage that the use of the wireless pen-mouse or pen-table mouse renders a user less tired than using a conventional mouse, the wireless pen-mouse or the pen-table has become increasingly popular.

A wireless pen-mouse typically includes one of an optical sensor, an acceleration sensor, a gyro sensor or the like so as to check position data of motion direction and velocity of a mouse body, and to transmit the position data to a computer for local area wireless communication. Further, the pen-tables typically include a pen, which generates an optical signal, a pressure signal, a RF signal, a sound signal or the like, and a pad, which receives the signal from the pen and creates a position data of the region where the signal is received. The position data created from the pad of the pen-table is transmitted to a computer via wired or wireless communication.

However, while the pen-table can check the relative position data more precisely than a wireless pen-mouse, pen-tables are much more expensive than a pen-mouse and thus are only employed in specific fields such as illustration, as their cost has been a hindrance to increasing their popularity.

SUMMARY OF THE INVENTION

Accordingly, the present invention provides a pen-table using a portable communication device having a widely-used touch-screen module.

In accordance with an exemplary aspect of the present invention, there is provided a portable electronic apparatus including a pen-table function, the apparatus may include: a touch-screen module for detecting contact with an external object and creating position data of a detected region; a local area communication module for transmitting and receiving data based on a local area communication protocol; a display module for displaying the detected region and information on a user interface (UI) and functions of the apparatus; and a controller for controlling the operations of the modules in response to the user's input so as to transmit position data created by the touch-screen module to an electronic device possibly including functions of a pen-table and local area communication.

The portable electronic apparatus may further include, for example, a mobile communication module for implementing a voice or video call based on a mobile communication protocol.

Preferably, when a user requests the apparatus to function as a pen-table, the controller controls the operations of the touch-screen module and the local area communication module so as to transmit the position data detected by a touch screen to an electronic device capable of including the functions of a pen-table and local area communication.

In accordance with another exemplary aspect of the present invention, a computer system using a pen-table generally includes: a first electronic apparatus and a second electronic apparatus, the first electronic apparatus including a touch-screen module for detecting contact with an external object and for creating position data of a detected region, a first local area communication module for transmitting and receiving data based on a local area communication protocol, a first display module for displaying the detected region and information on a user interface (UI) and functions supported by the apparatus, a first memory for storing an operating system (OS) and data for driving the UI, and a first controller for controlling the operations of the touch-screen module, the local area communication module, and the display module in response to the user's input and transmitting position data created by the touch-screen module to an electronic device capable of including functions of a pen-table and local area communication. The second electronic apparatus preferably includes a second local area communication module for transmitting and receiving data based on the local area communication protocol and for receiving the position data created by the touch-screen module, a second memory for storing an OS and data for driving a UI, a second display module for displaying the OS and information for which a user makes a request, and a second controller for controlling the operations of the functioning units in response to user's input and displaying the position data via the second display module.

The first electronic apparatus may comprise, for example, any of the following devices: a mobile communication terminal, a portable multimedia player (PMP), a MP3 player, and a portable navigation terminal, and the second electronic apparatus may preferably comprise a desktop computer or a laptop computer.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, exemplary embodiments of the present invention will be described with reference to the accompanying drawings. In the following description, various specific definitions, such as specific constitutional elements, etc., are provided only to help in a general understanding of the present invention by a person of ordinary skill in the art, and it is apparent to those skilled in the art that such definitions can be changed or modified within the scope of the present invention. Further, in the following description of the present invention, a detailed description of known functions and configurations incorporated herein may be omitted when it may obscure appreciation of the subject matter of the present invention rather unclear.

In the exemplary embodiments of the present invention, a local area communication indicates data communication performed through wire/wireless medium in a near distance. For example, the local area communication includes a wire communication using an Universal Serial Bus (USB), a Parallel Bus or a Serial Bus, and a wireless communication such as a Wireless personal Area Network (WPAN) and a Near Field Communication (NFC).

The present invention in this exemplary embodiment provides a portable electronic apparatus having a touch-screen module which checks the position data, provides this position data to an electronic device via local area communication, and then displays this position data onto the electronic device. Thus, the portable electronic apparatus having the touch-screen module can be used as a pen-mouse or a pen-table of the electronic device.

In an exemplary embodiment, the portable electronic apparatus illustrates a mobile communication terminal having a touch-screen module, and the electronic device illustrates a personal computer which can employ a pen-mouse or a pen-table as an external input device. However, the present invention is not limited to such definitions. For example, the portable electronic apparatus may be any electronic apparatus, including but in no way limited to a mobile communication terminal, PDA, portable multimedia player (PMP), MP3 player, portable navigation terminal, etc. having a touch-screen module. In addition, the electronic device may comprise virtually any device, including but in no way limited to personal computers, laptop computers, etc., if it can support local area wireless communication and display position data.

Figure 1:
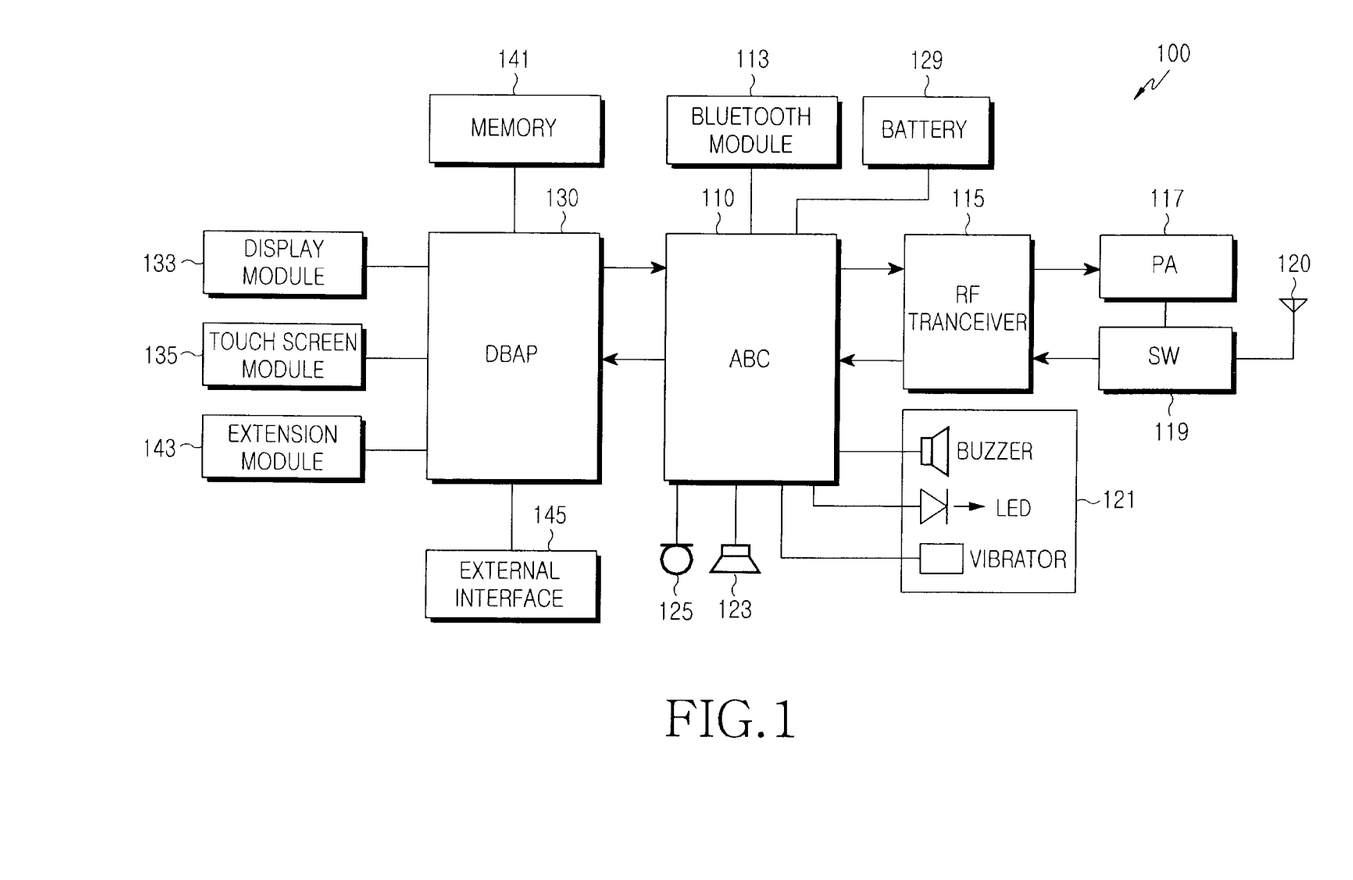
FIG. 1 is a block diagram illustrating the structure of a mobile communication terminal of a portable electronic apparatus according to an exemplary embodiment of the present invention.

FIG. 1 is a block diagram illustrating the structure of a mobile communication terminal of a portable electronic apparatus according to an exemplary embodiment of the present invention.

Now referring to the example shown in FIG. 1, the mobile communication terminal 100 includes a display module 133, such as a liquid crystal display or a light-emitting diode (LED) display, and a touch-screen module 135 which checks the position of the region where a user touches, using the change in radio frequency, resistance or voltage, ultrasonic waves, etc. and creates the position data (e.g., coordinates) of the touched region.

The mobile communication terminal 100 shown in FIG. 1 also preferably includes a digital baseband and application processor (DBAP) 130. The DBAP 130 processes input, prepares display data, and executes a software program (e.g. an OS program, an UI program, etc.) which controls the DBAP 130. That is, the software program executed by the DBAP 130 provides modes based on functions of the mobile communication terminal 100 via the display module 133. The DBAP 130 also provides logic for selecting any one mode from a user, using an input signal from the touch-screen module 135 or an external interface. For example, the DBAP 130 displays diverse modes including a mobile communication mode, a local area communication mode and a multimedia mode on a basic screen of an OS system such that a user can select any one mode from these modes.

In addition, the DBAP includes a sub-mode of the mobile communication mode, i.e. a voice call mode, a video call mode, and a data communication mode, a sub-mode of the local area communication mode (e.g. a Bluetooth mode), i.e. a data sync mode and a pen-table (or pen-mouse) mode, and a sub-mode of the multimedia mode, i.e. a video recording mode, a video reproducing mode, a voice recording mode, a voice reproducing mode, etc. Thus, when a user selects one mode among the mobile communication mode, the local area communication mode and the multimedia mode, the software program of the DBAP 130 displays the corresponding sub-modes of the selected mode such that a user can then select one mode from the sub-modes.

The software program may be stored, for example, in the memory in the DBAP 130 or external memory 141 (e.g. a flash memory) combined with the DBAP 130. The memory 141 may store user data (e.g. motion picture files, voice files, phone numbers, etc.). The DBAP 130 is also coupled with a port and an external interface 145 (e.g. a USB interface) for an extension module 143 (e.g. a smart digital card, etc.). The extension module 143 can provide an additional function(s) to a system (through storage of a software or data on a module for games, dictionaries or other useful items), and the external interface 145 enables the exchange of program and/or data with other systems.

The DBAP 130 is coupled with an analogue baseband controller (ABC) 110, so as to exchange data and commands with the ABC 110. The ABC 110 processes data from cellular phone signals or data for cellular phone signals in order to implement a conventional function of a portable phone, and also generates an audio signal in order to drive a speaker 123, and encodes the audio input from a microphone 125. The ABC 110 is coupled with an output device 1364 and controls the same.

A power source, included but in no way limited to battery 129 is coupled with all elements of the device 1354 in order to supply power. Generally, the battery 129 is rechargeable and has an input terminal for power charge.

The ABC 110 is coupled with an RF transceiver 115 so as to bilaterally exchange data received via an antenna 120. The RF transceiver 115, a power amplifier (PA) 117, a switch (SW) 119, and an antenna 120 may be element(s) of a conventional cellular phone.

Still referring to the example FIG. 1, the ABC 110 is coupled with a Bluetooth module 113 driven based on a Bluetooth communication protocol so as to transmit data, which is sent from the Bluetooth module 113 or the DBAP 130, to the DBAP 130 or the Bluetooth module 113. A person of ordinary skill in the art understands and appreciates that Bluetooth is but one possible transmission protocol that could be used.

Particularly, the ABC 110 receives, from the DBAP 130, a command instructing the Bluetooth module 113 to operate in correspondence with the driving of the software program provided in the DBAP 130 in a local area communication mode, and the ABC transmits the command to the Bluetooth module 113.

Moreover, according to an exemplary aspect of the present invention, if a user selects the pen-table (or pen-mouse) mode from among the plurality of modes provided by the software program of the DBAP 130, the DBAP 130 transmits the command instructing the Bluetooth module 113 to operate to the Bluetooth module 113 via the ABC 110. Then, the Bluetooth module 113 searches for an electronic device which can implement Bluetooth communication based on a Bluetooth communication protocol, and initiates Bluetooth communication with the found electronic device. The searched-for electronic device can use, for example a mouse or a pen-table (or a pen-mouse) as an external input interface, and can receive data received via the Bluetooth communication via input from the external input interface.

For example, still referring to FIG. 1, the searched electronic device may comprise a variety of different devices, including a personal computer, a laptop computer, etc., which can use a mouse or a pen-table (or a pen-mouse) as an external input interface and support local area wireless communication.

Figure 2:
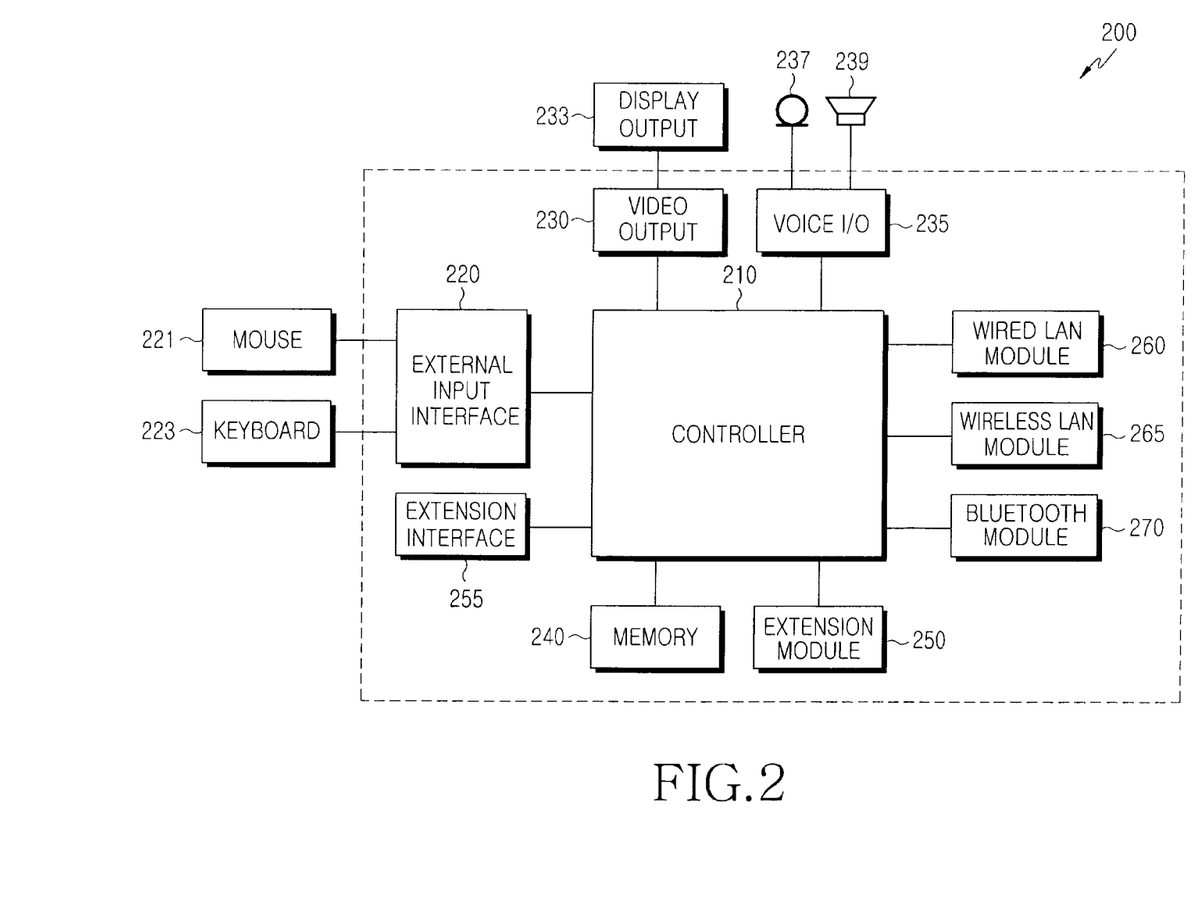
FIG. 2 is a block diagram illustrating the structure of an electronic device communicating via wireless communication with a portable electronic apparatus according to an exemplary embodiment of the present invention.

FIG. 2 is a block diagram illustrating the structure of an electronic device 200 communicating via wireless communication with a portable electronic apparatus according to an exemplary embodiment of the present invention.

Now referring to FIG. 2, the electronic apparatus includes a controller 210, an external input interface 220, a video output 230, a voice I/O 235, a memory 240, an extension module 250, an extension interface 255, a wired LAN module 260, a wireless LAN module 265, and a Bluetooth module 270.

The controller 210 executes a software program (e.g. an OS program) as a microprocessor generally provided in a personal computer. That is, the controller 210 transmits data, which is basically provided by an OS program, to a video processor 230 using a user interface (e.g. Graphic User Interface (GUI)), and processes input from the external input interface 220. The external input interface 220 is preferably coupled with an external input device such as a mouse 221, a keyboard/keypad 223, etc., and converts motion information, key input code, or the like into data which is perceivable by the controller 210 and provides the same.

The software program may be stored in the memory 240 (e.g. a flash memory, a magnetic recording device or the like) and combined with the controller 210. Furthermore, the software program may include diverse programs (e.g. a software program for text-editing, a software program for encoding and decoding of a motion picture, an image-editing program), which are installed by a user, in addition to an OS program.

Still referring to the example in FIG. 2, the controller 210 is also coupled with a port and an extension interface 255 (e.g. a USB interface) for an extension module 250 (e.g. a smart digital card, etc.). The extension module 255 can provide an additional function(s) to a system (through storage of a software or data on a module for games, dictionaries or other useful items), and the extension interface 255 enables the exchange of a program and/or data with other systems.

The controller 210 provides data for voice output to the voice I/O 235. Answering to this, the voice I/O 235 converts data from the controller 210 into an analog voice signal so as to create a signal for driving a speaker 239. The voice I/O 235 converts a signal from a microphone 237 into a digital signal and transmits the digital signal to the controller 210, which in turn encodes the transmitted signal and stores it in the memory 240.

Furthermore, the controller 210 can be coupled with the wired LAN module 260, the wireless LAN module 265, and the Bluetooth module 270, and can transmit a command instructing the communication modules 260, 265 and 270 to start or stop operating, or can control the transmission and reception of data via the communication modules 260, 265 and 270.

The Bluetooth module 270 may transmit data, which is stored in the memory 240, to a Bluetooth module provided in other electronic device, receive data transmitted from other electronic device and provide it to the memory 240, or otherwise receive voice data transmitted from other electronic device and provide it to the voice I/O 235.

In particular, the Bluetooth module 270 preferably provides the external input interface 220 with position data created while operating in the pen-table (or pen-mouse) mode among data transmitted by other electronic device. Correspondingly, the position data is converted, via the external input interface 220, into data perceivable by the controller 210. The controller 210 creates, on a region corresponding to the position data, data for indicating the mouse pointer, and then provides it to the video output 230.

Figure 3:
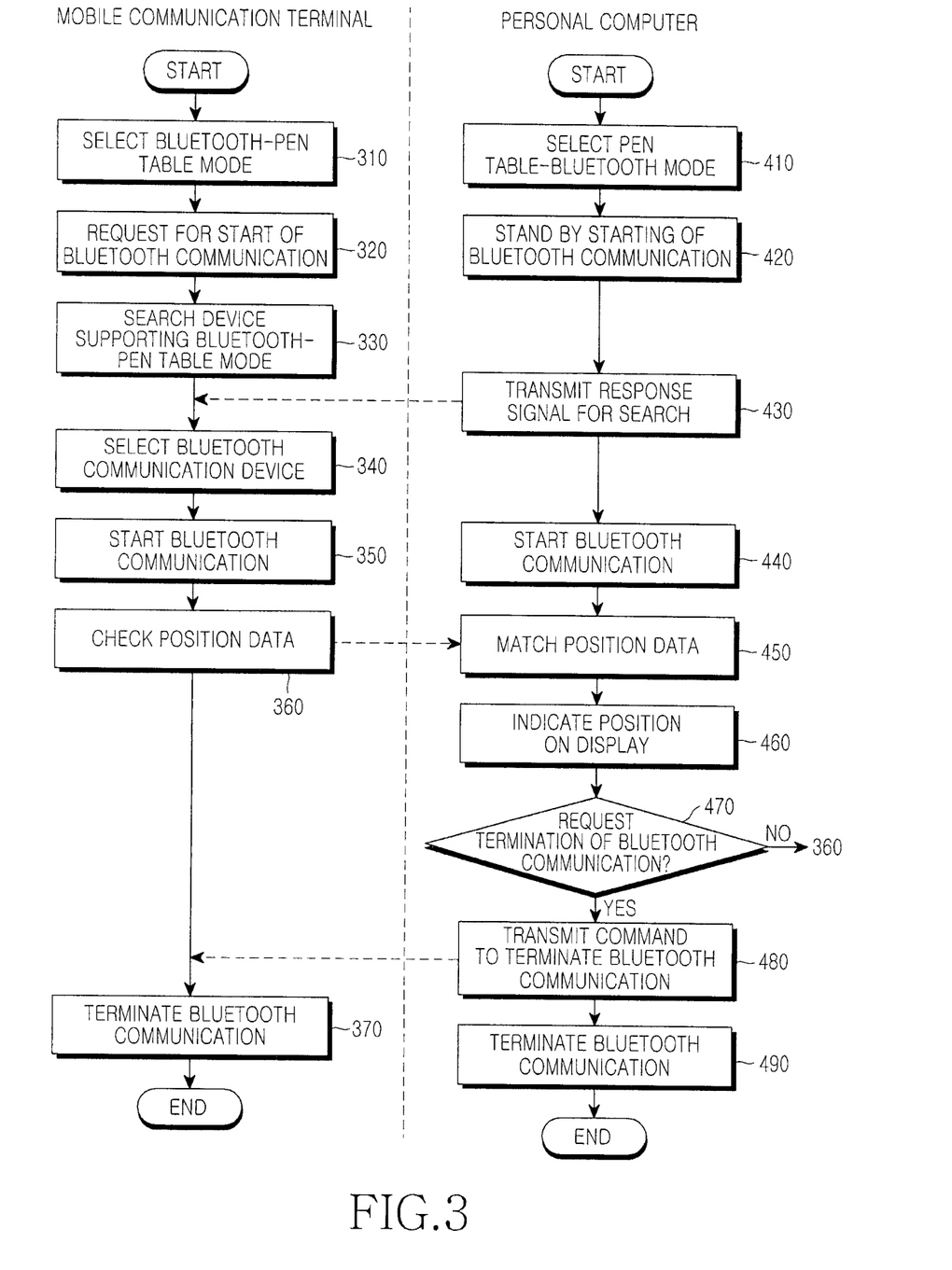
FIG. 3 is a flow chart illustrating exemplary operation of a portable electronic apparatus functioning as a pen-table according to an exemplary embodiment of the present invention.

FIG. 3 is a flow chart illustrating exemplary operation of a portable electronic apparatus functioning as a pen-table according to an exemplary embodiment of the present invention.

Referring now to FIG. 3, exemplary steps 310 to 370 illustrate the operation of a portable electronic apparatus, e.g. a mobile communication terminal, functioning as a pen-table, and exemplary steps 410 to 490 illustrate the operation of an electronic device, e.g. a personal computer, which can perceive position data input from the portable electronic apparatus.

First, the DBAP 130 provided in the mobile communication terminal executes an OS program, a UI program, which is installed in the DBAP, so as to display the mobile communication mode, the local area communication mode and the multimedia mode on a basic picture thereof such that a user can select one of the modes.

In step 310, if a user selects a Bluetooth mode from among the modes displayed on the basic screen, the DBAP 130 displays a data sync mode and a pen-table (or pen-mouse) mode, which are the sub-modes of the Bluetooth mode. Then, the user selects the pen-table (or pen-mouse) mode from the sub-mode.

In step 320, when the user selects the Bluetooth mode and the pen-table mode, the DBAP 130 transmits, to the Bluetooth module 113 via the ABC 110, a command instructing the Bluetooth module 113 to start implementing Bluetooth communication.

Next, at step 330, the Bluetooth module 113 implements an initialization for Bluetooth communication based on a Bluetooth communication protocol and searches a device which supports the Bluetooth mode and the pen-table mode.

Meanwhile, the controller 210 provided in the personal computer executes an OS program installed therein. In particular, the OS program provides logic determining whether or not to use a pen-table as an external input device and selecting a device which receives information from the pen-table. Then referring to the "personal computer" flowchart, a user makes a selection using the pen-table and receives information from the pen-table via the Bluetooth module (step 410). Responding to this selection, the Bluetooth module 270 implements an initialization for Bluetooth communication based on a Bluetooth communication protocol and stands by receiving a search signal broadcasted from other Bluetooth communication device (step 420).

When the Bluetooth module 270 provided in the personal computer receives the search signal broadcasted from the Bluetooth module 113 provided in a mobile communication terminal, the Bluetooth module 270 creates a response signal to the search signal together with an identifier of the personal computer, and transmits them (step 430).

The Bluetooth module 113 provided in the mobile communication terminal receives the response signal to the search signal, checks the identifiers of the apparatuses which transmitted the response signal, and provides the same to the DBAP 130 via the ABC 110. The DBAP 130 displays the apparatuses which transmitted the response signal, provides logic to help select which device will implement Bluetooth communication, and selects at least one device (e.g. a personal computer) to implement Bluetooth communication by the user's selection (step 340).

Next, the DBAP 130 informs the Bluetooth module 113 of the selected device (e.g. a personal computer), the Bluetooth module 113 requests the selected device (e.g. a personal computer) to start implementing Bluetooth communication, and then the Bluetooth communication with the selected device (e.g. a personal computer) is started (steps 350 and 440).

When the Bluetooth communication is started, the DBAP 130 of the mobile communication terminal provides the Bluetooth module 113 with position data (e.g. coordinates) that the touch-screen module 135 perceives.

Then, at step 360, the Bluetooth module 113 transmits the position data to the Bluetooth module 270 of the personal computer (step 360).

The Bluetooth module 270 of the personal computer checks the position data and transmits the same to the controller 210 via the external input interface 220.

Then, at step 450 the controller 210 checks the resolution of the monitor 233 set via the OS program and resets the position data corresponding to the resolution of the monitor 233.

When the position data is reset in step 450, the controller 210 at step 460 creates a mouse pointer, sets the mouse pointer to be located on a region corresponding to the position data, and controls the operation of the video output such that the mouse pointer is indicated on the monitor 233.

The steps 360, 450 and 460 are repeatedly implemented at predetermined time intervals (e.g. 1 ms) until there is a request to terminate the Bluetooth communication.

Meanwhile, at step 470, when a user selects an option to end the pen-table using the Bluetooth communication via the software program provided in a personal computer, the controller 210 requests the Bluetooth module 270 to terminate the Bluetooth communication.

Then, at step 480, the Bluetooth module 270 provided in a personal computer transmits, to the Bluetooth module 113 of the mobile communication terminal, a command instructing the module to terminate the Bluetooth communication; and finally at step 490, the Bluetooth communication is terminated.

The Bluetooth module 113 of the mobile communication terminal, which receives the command to terminate the Bluetooth communication, terminates the Bluetooth communication and informs the DBAP 130 of the termination of Bluetooth communication, and at step 370, the DBAP 130 indicates the termination of Bluetooth communication via a display.

As disclosed herein, the present invention can use, as a pen-table, a portable electronic apparatus which a user always carries, so that there is no need to separately purchase an expensive pen-table. In addition, using a portable electronic apparatus functioning as a pen-table, a personal computer, a laptop computer or the like can be controlled precisely and conveniently.

According to the present invention, because the always-carriable portable electronic apparatus can be used as a pen-table, there is no need to install or carry a mouse, a pen-table, etc. for controlling a personal computer, a laptop computer or the like.

Further, without separately purchasing an expensive pen-table, but using the portable electronic apparatus functioning as a pen-table, a personal computer, a laptop computer, etc. can be controlled precisely and conveniently.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general or special purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method comprising:
receiving, at a first electronic device, an input from an object external to the first electronic device via at least one region of a touch screen operatively coupled with the first electronic device;
obtaining, by the first electronic device, position data of the input corresponding to the at least one region; and
transmitting, by the first electronic device, the position data to a second electronic device external to the first electronic device such that the position data corresponding to a resolution of a display of the second electronic device is reset in the second electronic device, wherein an indication representing the input is presented via the display operatively coupled with the second electronic device at a region corresponding to the position data.

2. The method of claim 1, wherein the indication is displayed using an application executing in the second electronic device.

3. The method of claim 2, wherein the application comprises at least one of an image editing application, a multimedia application, a text editing application, a game application or a dictionary application.

4. The method of claim 1, wherein the first electronic device is configured to: present one or more functions supported by the first electronic device.

5. The method of claim 1, wherein the position data is selectively converted to a corresponding one of a first region or a second region of the display based at least in part on a resolution of the display.

6. The method of claim 1, wherein the first electronic device is configured to: provide at least one of a voice call or a video call.

7. The method of claim 1, wherein at least one portion of the position data is transmitted via at least one of Bluetooth, universal serial bus, a parallel bus, a serial bus, a wireless personal area network, Wi-Fi, or near field communication.

8. The method of claim 1, further comprising: displaying, at the first electronic device, graphical information corresponding to the position data.

9. An apparatus comprising:
a touch screen to receive an input from an object external to the apparatus; and
a controller operatively coupled with the touch screen, the controller configured to:
obtain position data of the input corresponding to at least one region of the touch screen through which the input is received; and
transmit the position data the to an electronic device external to the apparatus such that the position data corresponding to a resolution of a display of the external electronic device is reset, wherein an indication representing the input is presented via the display operatively coupled with the external electronic device at a region corresponding to the position data.

10. The apparatus of claim 9, wherein the controller is configured to: provide at least one of a voice call or a video call.

11. The apparatus of claim 9, wherein the indication is displayed using an application executing in the electronic device.

12. The apparatus of claim 9, further comprising: at least one display, wherein the controller is configured to: display, via the at least one display, graphical information corresponding to the position data.

13. The apparatus of claim 9, wherein the controller is configured to: present one or more functions supported by the apparatus.

14. The apparatus of claim 9, wherein the position data comprises coordinates corresponding to the at least one region, the coordinates obtained using a change of at least one of radio frequency, resistance, voltage, ultrasonic waves, an optical signal, a pressure signal, or a sound signal.

15. An apparatus comprising:
a display; and
a controller operatively coupled with the display, the controller configured to:
receive, from an electronic device external to the apparatus, position data corresponding to an input detected via at least one region from of a touch screen operatively coupled with the electronic device and resetting the position data corresponding to a resolution of the display; and
present an indication representing the input via the display at a region corresponding to the position data.

16. The apparatus of claim 15, wherein the controller is configured to: convert the position data to a corresponding one of a first region or a second region of the display based at least in part on a resolution of the display.

17. The method of claim 1, wherein the indication is presented at a first region of the display based at least in part on a determination that the position data corresponds to a first region of the touch screen, and the indication presented at a second region of the display based at least in part on a determination that the position data corresponds to a second region of the touch screen.

18. The apparatus of claim 9, wherein the indication is presented at a first region of the display based at least in part on a determination that the position data corresponds to a first region of the touch screen, and the indication is presented at a second region of the display based at least in part on a determination that the position data corresponds to a second region of the touch screen.

19. The apparatus of claim 15, wherein the controller is configured to: present the indication at a first region of the display based at least in part on a determination that the position data corresponds to a first region of the touch screen, and present the indication at a second region of the display based at least in part on a determination that the position data corresponds to a second region of the touch screen.

20. The apparatus of claim 15, wherein the indication comprises a graphical indication.

* * * * *

UNITED STATES PATENT AND TRADEMARK OFFICE
CERTIFICATE OF CORRECTION

PATENT NO.        : 9,253,267 B2
APPLICATION NO.   : 14/141763
DATED             : February 2, 2016
INVENTOR(S)       : Young-Suk Kim et al.

Page 1 of 1

It is certified that error appears in the above-identified patent and that said Letters Patent is hereby corrected as shown below:

In the Claims

Column 9, Claim 9, Line 12 should read as follows:
--...data to an electronic...--

Column 10, Claim 15, Line 7 should read as follows:
--...from a touch screen...--

Column 10, Claim 17, Line 20 should read as follows:
--...indication can be presented...--

Signed and Sealed this
Third Day of May, 2016

Michelle K. Lee
*Director of the United States Patent and Trademark Office*